Aug. 1, 1967     I. JEPSON ETAL     3,333,824
FOOD MIXER
Original Filed Jan. 10, 1963     4 Sheets-Sheet 2
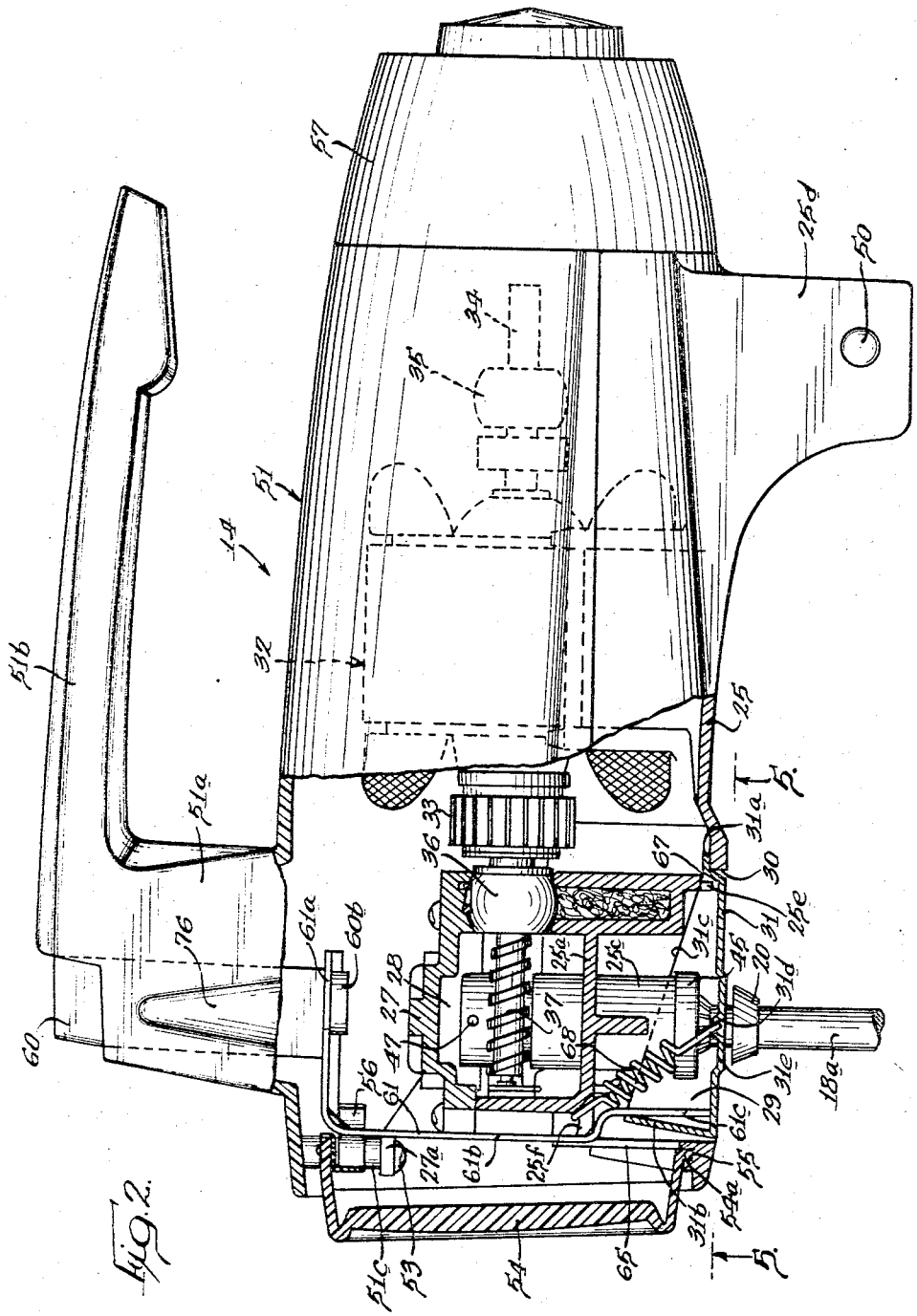
INVENTORS:
Ivar Jepson
Gilbert R. Wolter
By George R. Clark
Atty Aug. 1, 1967   I. JEPSON ET AL   3,333,824
FOOD MIXER
Original Filed Jan. 10, 1963
4 Sheets-Sheet 3
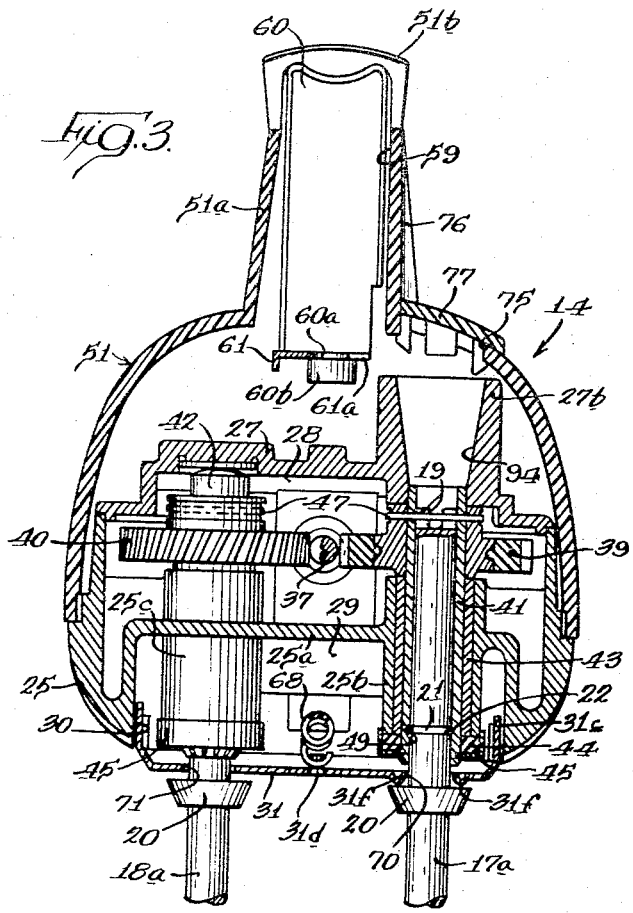
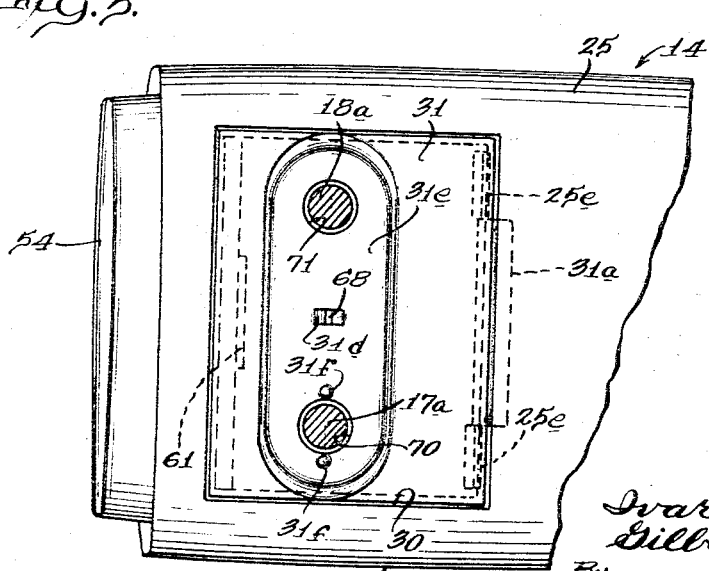
INVENTORS:
Ivar Jepson
Gilbert R. Wolter
By George R. Clark
Atty

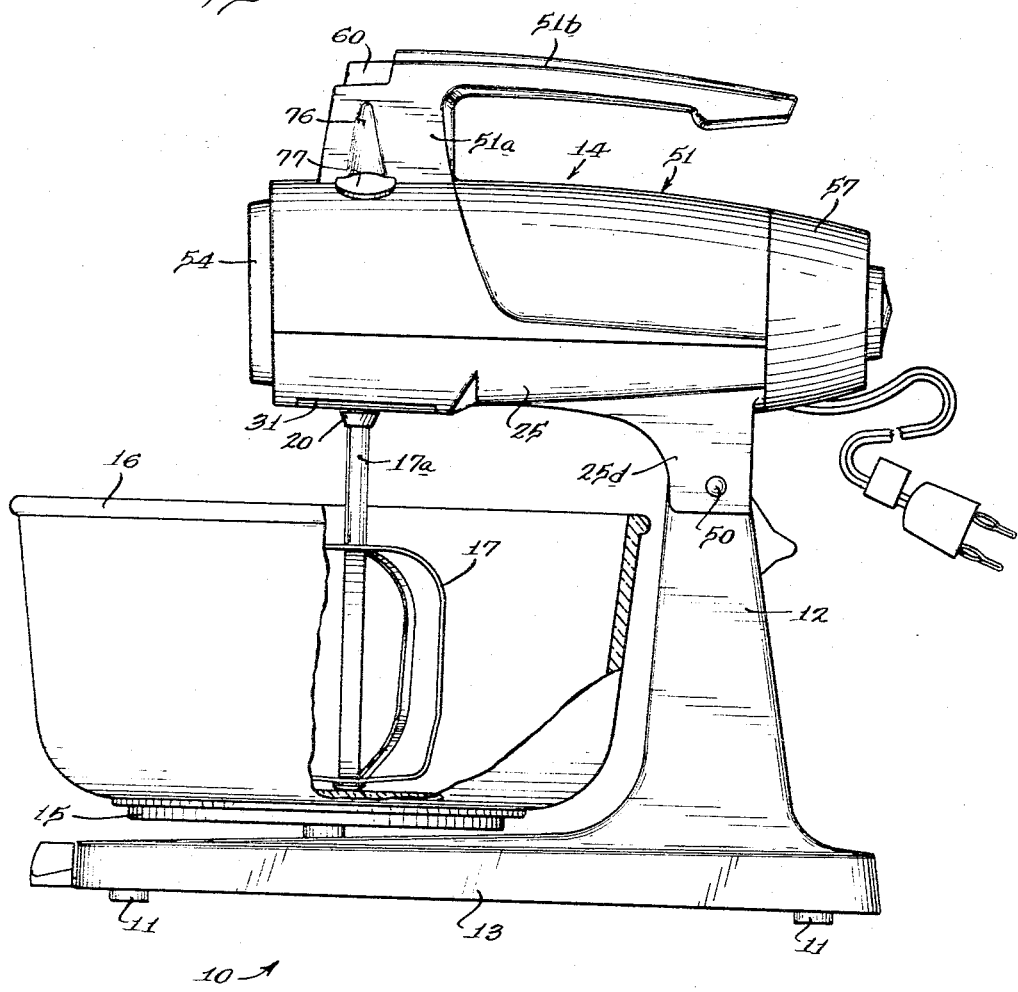

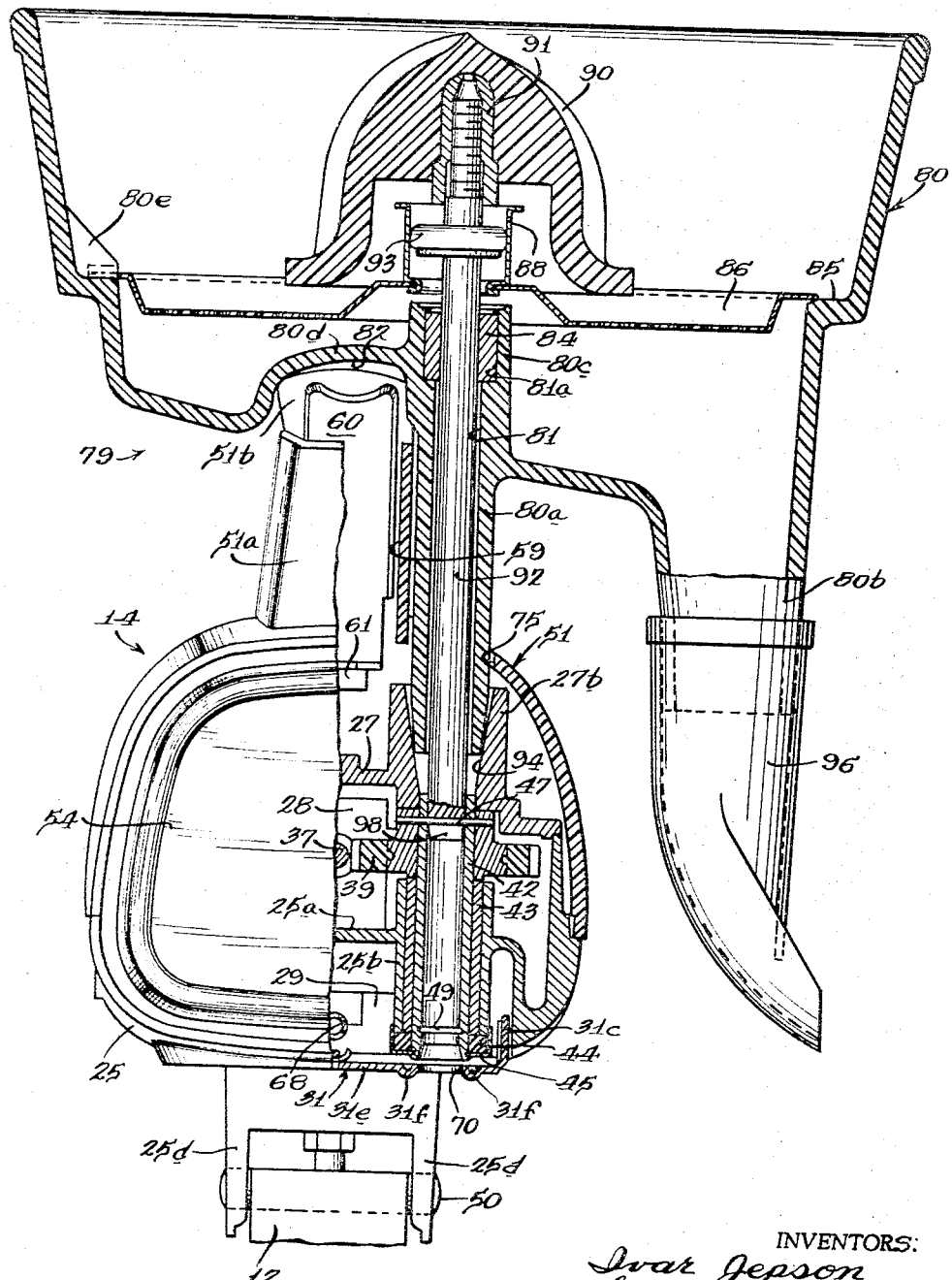

United States Patent Office 3,333,824
Patented Aug. 1, 1967

3,333,824
FOOD MIXER
Ivar Jepson, South Duxbury, Mass., and Gilbert R. Wolter, Elmhurst, Ill., assignors to Sunbeam Corporation, Chicago, Ill., a corporation of Illinois
Original application Jan. 10, 1963, Ser. No. 250,554. Divided and this application Feb. 17, 1966, Ser. No. 528,270
3 Claims. (Cl. 259—1)

The present application is a division of copending Jepson and Wolter application Ser. No. 250,554, filed Jan. 10, 1963, and assigned to the same assignee as the instant application. It relates to food mixers, and more particularly to household food mixers useful in connection with food preparation, orange juice extraction and the like. The present invention is related to Jepson Patents 2,533,811, 2,552,972, 2,615,690, 2,703,381, 2,987,636 and 3,097,318, as well as Jepson and Chambers Patent 3,077,340, all assigned to the same assignee as the instant application.

Food mixers usually comprise an encased motor and gear unit together with beater shafts rotatably mounted and driven by the gear unit. The more elaborate household food mixers also include means whereby the mixer may have associated therewith a juice extractor driven by the motor which normally drives the beaters. Additionally it is common practice to provide beater ejecter means to remove the beater shafts and beaters from the mixer for cleaning purposes without requiring the operator to touch the beater shafts or beater elements. It would be desirable to provide a household food mixer with which a juice extractor mechanism could be associated which has no projecting members or the like for supporting the associated juice extractor and wherein the encased motor driven power unit normally has the appearance of a unit which does not accommodate a juice extractor. It would also be desirable to provide for such a mixer an improved beater ejector arrangement which is simple and compact, which can be manipulated by the user with great ease and which will in no way interfere with the juice extractor unit when the latter is associated with the mixer.

Accordingly, it is an object of the present invention to provide an improved household food mixer with improved means for associating a juice extractor therewith.

It is another object of the present invention to provide an improved juice extractor mechanism with drive means for relating the same to a food mixer which is simple to use, foolproof in operation and inexpensive to manufacture.

Still another object of the present invention resides in an improved beater ejector mechanism associated with such mixer which will in no way interfere with a juice extractor mechanism associated with such mixer.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 1 is an elevational view, with certain parts cut away, of a household food mixer embodying the present invention shown when used to perform a mixing operation;

FIG. 2 is an enlarged view of a portion of FIG. 1 with certain portions cut away more clearly to indicate certain features of the present invention;

FIG. 3 is a sectional view taken through the gear mechanism and spindle drive of the power unit of FIG. 2, assuming FIG. 2 shows the complete structure, but with certain portions cut away more clearly to illustrate the portion of the apparatus with which the juice extracting mechanism is associated;

FIG. 4 is an enlarged view partly in section, showing the juice extracting mechanism associated with the mixer of the present invention, a portion of the mixer in FIG. 4 being shown in section in the same manner as in FIG. 3; and FIG. 5 is a fragmentary sectional view taken substantially on line 5—5 of FIG. 2 assuming FIG. 2 shows the complete structure.

Briefly, the present invention is concerned with a household food mixer of the type capable of performing a large number of functions, including food mixing, juice extracting and the like. The present invention is primarily concerned with an improved drive arrangement for a juice extracting mechanism readily associated with the motor unit of the food mixer, and an improved beater ejector mechanism. The beater ejector comprises a pivotally mounted plate or ejector cup disposed to close an opening in the lower part of the encased power unit which is spring biased to a predetermined position but which may be depressed to engage the conventional enlargements provided on the beater shafts for ejecting the same. This ejector cup or plate is actuated by a longitudinally movable ejector link connected to a push button extending through the handle of the power unit. The citrus fruit juice extractor is adapted to be associated with the food mixer by inserting a portion of the extractor into an opening in the motor casing so that the spindle of the reamer drivingly engages one of the hollow spindles in the mixer which normally drives one of the beaters. This juice extractor, when associated with the mixer, does not interfere with the beater ejector mechanism.

Referring now to the drawings, there is illustrated an electric food mixer generally indicated by the reference numeral 10, which is commonly designated as a household food mixer. It comprises the conventional encased power unit 14 detachably and pivotally mounted to a more or less vertical upright or standard 12 which, in turn, is supported from a suitable base 13 provided with legs 11. The base 13 is provided with a suitable rotatable platform or mixing bowl turntable 15. Supported for rotation on the turntable 15 are conventional mixing bowls, such as 16. The particular mixing bowl 16 illustrated in FIG. 1 of the drawings is what is commonly termed a large size mixing bowl and conventionally such home food mixers are also supplied with smaller mixing bowls whereby the proper size may be selected depending upon the particular mixing operation to be performed.

As illustrated, the food mixer 10 comprises a pair of spaced beater elements 17 and 18, only the element 17 being visible in FIG. 1 of the drawings. These beater elements 17 and 18 and the bowl mounting arrangements are preferably such as are disclosed and claimed in Jepson Patent 2,615,690, granted Oct. 28, 1952, and assigned to the same assignee as the present application. The beaters 17 and 18 are preferably identical with those disclosed in Jepson Patent 2,615,690 and each comprises a substantially identical beater spindle shank designated as 17a and 18a, respectively in FIGS. 2, 3 and 5 of the drawings. These beater spindle shanks or beater shafts are adapted to be received within the recesses of hollow shaft members described hereinafter. The ends of the beater shanks are provided with crossed notches 19 for making driving engagement with cooperating means defined in the hollow shaft members described hereinafter. Preferably also, and as fully disclosed in the above-mentioned Jepsen patent, the beater spindle shanks 17a and 18a are each provided with an ejecting projection in the form of a conical member 20 secured or fixed thereto for cooperating with suitable beater ejector means described hereinafter. To removably retain the beater elements 17 and 18 within the hollow shaft members, each of the beater spindle shanks 17a and 18a are provided above the conical members 20 with an annular recess 21 for receiving therein a spring retainer 22.

The encased power unit 14 is in many respects similar to that disclosed in the above-mentioned Jepson Patent 3,097,318 except that the speed control knob instead of being associated with the handle of the unit is like that disclosed in Jepson Patent 2,703,381 referred to above. As illustrated in the drawings, the power unit 14 comprises a motor base member 25 preferably formed as a die casting which is in many respects similar to that disclosed in the above-mentioned Jepson and Chambers Patent 3,077,340 and Jepson Patent 3,097,318. The base member 25 is essentially a platform from which project various support members and the like integrally formed with the platform. As illustrated, the base member 25 includes a portion 25a at the forward part of the power unit 14 defining a shallow upwardly opening recess which together with a gear box cover 27 defines a gear chamber 28 (FIGS. 2 and 3).

Integrally formed with the portion 25a are downwardly directed spaced parallel sleeve portions 25b and 25c which house hollow rotatable driving spindles for the beater elements 17 and 18. The base 25 is shaped to provide a recess 29 beneath the portion 25a into which recess the sleeves 25b and 25c depend. Moreover, access to the recess 29 is defined by a rectangular opening 30, best shown in FIG. 5 of the drawings. The depending sleeve portions 25b and 25c are directed toward the opening 30 but terminate just short of it. The recess 29 effectively defines a beater ejector chamber and the opening 30 is effectively closed by a beater ejector cup or member 31 described in greater detail hereinafter.

As is fully disclosed in the above-mentioned Jepson Patent 3,097,318, the base 25 is provided with suitable integral projections for supporting an electric motor, generally designated at 32, which motor may be identical with that disclosed in said patent. Preferably the motor is of the universal type having a commutator 33 and suitable brushes, not shown. The commutator 33 is rotatable with an armature shaft 34 which latter is journalled in bearings 35 and 36, the bearing 36 being supported by means defining gear chamber 28. Moreover the forward end of the armature shaft 34 is provided with a worm 37 disposed within the gear chamber 28. This worm 37 may be identical with that disclosed in a number of the above-mentioned patents. As is disclosed in the above-mentioned patents, the worm 37 drives a pair of worm gears 39 and 40. The gears 39 and 40 are drivingly connected to a different one of a pair of hollow driving spindles 41 and 42, which spindles are journalled in suitable bearings 43 disposed within the sleeve portion 25b and 25c depending from the base member 25. Preferably a suitable spindle seal designated at 44 is provided at the lower end of each bearing and held in place by an associated spindle seal retainer 45. The gears 39 and 40 are preferably keyed or otherwise drivingly secured to the associated spindle sleeves 41 and 42, respectively. The hollow spindles 41 and 42 are very similar, the difference being that the spindle 42 is closed at the top whereas the spindle 41 is open at the top, the reason for which will become apparent from the ensuing description.

In order to provide a driving connection between the hollow spindles 41 and 42 and the beater shanks 17a and 18a, respectively, suitable pins 47 are provided, one for each spindle, which are adapted to engage one of the crossed notches 19 of the beater elements, as best shown in FIG. 3 of the drawings. Preferably each spindle sleeve 41 and 42 is provided with an annular recess 49 for receiving the spring retainer 21 of the associated beater shank to releasably retain the beater shanks 17a and 18a in driving relationship with the pins 47. It will be appreciated that rotation of the armature shaft 34 will cause rotation in opposite directions of the two worm gears 39 and 40 and, hence, of the beater elements 17 and 18. It will, moreover, be appreciated that the beater elements 17 and 18 may readily be removed from the associated spindle sleeves 41 and 42 by applying a force along the longitudinal axes of the beater shanks in a direction away from the hollow spindles 41 and 42 rotatably mounted within the depending sleeves 25b and 25c, respectively.

For the purpose of supporting the power unit 14 from the stand comprising the vertical support 12, the former is preferably provided with integral depending spaced projecting portions 25d for supporting a pivot pin 50 whereby the power unit 14 may be supported from the upper end of the stand comprising the vertical support 12.

In order to complete the enclosure for the power unit 14, there is provided a housing unit or cover member 51 preferably formed of a molded plastic including an integral upwardly projecting post portion 51a which terminates in an integral rearwardly extending handle portion 51b. The unit 51 is secured as by fastening means 53 to projections 27a integrally formed with the gear box cover 27. As illustrated, the housing unit 51 is provided with projections 51c having tapped openings therein for receiving the fastening means 53. The front of the power unit 14 is preferably closed by a suitable escutcheon plate 54 which may include an integral flange 54a at the lower end thereof for receipt in a suitable groove 55 defined in the base member 25. Preferably the upper portion of the escutcheon member 53 is provided with a spring clip 56 which may engage projections 51c of the plastic housing unit 51.

For controlling the operation of the motor 32, there is associated with the rear of the power unit 14 a rotatable cup-shaped member 57 which may be very similar to the corresponding member disclosed in Jepson Patent 2,703,-381. This member 57 serves as a control knob for manually adjusting the speed at which the motor operates and also for controlling an "On"-"Off" switch. Moreover, it provides means upon which suitable indicia indicating the various mixing speeds and the proper adjustment of the knob 57 for selected mixing operations.

In accordance with the present invention, the post portion 51a joining the handle 51b to the housing portion 51 is provided with an opening 59 for accommodating a longitudinally movable ejector button 60 reciprocably movable within post portion 51a which is preferably hollow as indicated in FIG. 3 of the drawings. The button 60 projects slightly above a depressed portion at the front of the handle 51b in the post 51a as best shown in FIG. 2 of the drawings, so that it can readily be engaged by the thumb of the user while grasping the handle 51b. The lower end of the ejector button 60, which is preferably formed of a molded plastic, is provided with a narrow neck portion 60a connected to an enlarged button portion 60b. The neck portion 60a is receivable within the space defined between the tines 61a of the forked end of an L-shaped ejector link 61 as is shown in FIGS. 2 and 3 of the drawings. The ejector link 61 has the leg 61b thereof extending downwardly just forwardly of the gear chamber 28 and into the ejector chamber 29. Preferably an offset portion 61c of the ejector link 61 extends downwardly to about the bottom of the base 25, as viewed in FIG. 2 of the drawings. In order to guide the reciprocal movement of the ejector link 61 the base 25 is preferably provided with a recess at the center of the forward end defining a pair of spaced shoulders 65, only one of which is visible in FIG. 2 of the drawings. These spaced shoulders guide the reciprocal movement of the link 61.

For the purpose of applying an ejecting force to the beater shanks 17a and 18a, there is provided the ejector cup or member 31 which, as was mentioned above, is adapted substantially to fill the rectangular opening 30 in the bottom of the base member 25. As illustrated, the ejector plate or cup 31 is provided with a rearwardly directed flange 31a adapted to overlie the lower wall of the base 25 defining the rear of the opening 30. Actually the motor base is provided with a depending cross wall portion 25e which with the lower wall of the base 25 defines a narrow slot 67 into which the flange 31a projects thereby defining a sort of a hinge. At the front of ejector cup 31 there is provided an upwardly directed wall portion 31b and at the sides thereof triangular shaped wall portions 31c as best shown in FIG. 2 of the drawings. The walls 31b and 31c provide the somewhat cup-shaped configuration and, hence, the designation of an ejector cup, although it might equally well be referred to as an ejector plate.

In order to bias the ejector cup 31 to the position shown in FIG. 2 of the drawings, there is provided a tension spring 68 which has one end thereof engaging an integral loop portion 31d defined at a central portion of the cup 31. The other end of the tension spring 68 is hooked to a projection 25f of the base portion 25, as best shown in FIG. 2 of the drawings.

So that the ejector cup 31 may perform a beater ejector operation, it is provided with a depending portion 31e extending thereacross as best shown in FIG. 5 of the drawings with suitable openings 70 and 71 defined therein to permit the spindle shafts 17a and 18a to be inserted therethrough for driving engagement with the associated spindle sleeves 41 and 42, respectively. It will be apparent that downward movement of the ejector button 60 with the consequent downward movement of the ejector link 61 will cause the ejector cup 31 to pivot about the rear edge of the opening 30 and engage the cone shaped members 20 with the resultant ejection of the associated beater elements 17 and 18. In order that the maximum force required for ejecting the beaters is not twice that required to eject a single beater, the ejector plate adjacent the beater shaft 17a is provided with projections 31f at diametrically opposed points adjacent opening 70, as best shown in FIGS. 3 and 5 of the drawings so that the beater shaft 17a is ejected before the beater shaft 18a.

In order that the food mixer 10 may have associated therewith a juicer extracting device of the type shown in Jepson Patent 2,533,811 without interfering with the beater ejector button or the like, there is provided, as best shown in FIGS. 3 and 4 of the drawings, an opening 75 in the plastic housing 51 adjacent the post 51a. Preferably a recess 76 is defined in the outside wall of the post 51a adjacent the opening 75. When the mixer 10 is used for mixing operations and not as a juice extractor a suitable removable cover member 77 normally closes the opening 75 to prevent foreign material from entering the motor and gear chamber.

The juice extracting mechanism, generally designated at 79, may be very similar to that disclosed in Jepson Patent 2,533,811 and comprises an open top juice bowl generally designated at 80, preferably molded from a suitable plastic. At the bottom center of this bowl there is provided an elongated integral depending guiding and supporting portion 80a and an integral depending spout portion 80b. The portion 80a is illustrated as being of tubular configuration but may have other forms. It projects into the bowl a substantial distance above the bottom of the bowl 80 and is designated as 80c. The bore in coextensive tubular portions 80a and 80c is designated as 81. The bottom of the juice bowl 80 is preferably also provided with a raised portion 80d defining a recess 82 on the underside of the bowl for accommodating the handle 51b and the knob 60, as is readily apparent from FIG. 4 of the drawings when the juice extracting device 79 is associated with the power unit 14 of the mixer 10. The bore 81 in tubular portion 80c extending into the juice bowl 80 is provided with a counterbore 81a to accommodate a suitable bearing 84.

For supporting a strainer, the juice bowl 80 is provided with a circumferential ledge 85 upon which a suitable strainer 86 may rest. So that the strainer is kept from rotating, the juice bowl 80 is provided with an integral projection 80e adjacent the ledge 85 receivable within a suitable notch defined in the periphery of the strainer 86 in the identical manner disclosed in the abovementioned Jepson Patent 2,533,811. The strainer 86 is provided with a central opening to which is secured an upstanding strainer cup 88. Any suitable reamer, generally designated at 90, may be provided which is suitable for extracting juice and pulp from fruits and vegetables. In the illustrated embodiment, the reamer is of ceramic or plastic material having a metal insert 91 which is threaded to permit securing the reamer 90 to a suitable reamer shaft 92 journalled in the bearing 84. An eccentric cam 93 is secured to the reamer shaft, as clearly shown in FIG. 4 of the drawings, so as to be disposed within the strainer cup 88. Rotation of the reamer and reamer shaft 92 and the associated eccentric cam 93 will cause the strainer to move back and forth with respect to the juice bowl 80 in exactly the same manner as is disclosed and claimed in Jepson Patent 2,533,811.

The tubular portion 80c of the juice bowl 80 extends into the bowl a sufficient distance so that juice removed from citrus fruit or the like will never collect in the bowl to a sufficient height to enter the bore 81 and, hence, the bearing 84. If desired, a suitable directing spout 96 may be associated with the spout 80b, as is shown in FIG. 4.

For the purpose of rotating the reamer 90, the concentrically arranged reamer shaft 92 and tubular projection 80a are inserted through the opening 75 in the plastic housing 51, this opening being designed to just receive the depending tubular portion 80a. Moreover, the recess 76 in the post portion 51a adjoining the handle portion 51b of the housing 51 suitably engages the outer surface of tubular portion 80a to provide additional support.

As illustrated best in FIGS. 3 and 4 of the drawings, gear box cover 27 is provided with an integral open top upwardly directed projection 27b, specifically illustrated as a tubular projection, coaxially disposed with respect to hollow rotatable spindle 41. Obviously projection 27b could have various forms as far as the exterior is concerned and might comprise a plurality of spaced projections capable of performing a guiding and supporting function as described hereinafter. Preferably projection 27b is constructed to have a tapered or conically shaped surface or bore 94 herein. The narrow diameter of the conical bore 94 is adjacent the upper end of hollow spindle sleeve 41 so that when the concentrically disposed reamer shaft 92 and depending tubular portion 80a of the juice bowl 80 are inserted through opening 75, the lower end of the tubular depending portion 80a will be received in conical bore 94 as clearly shown in FIG. 4 of the drawings. The juice bowl 80 is provided with an integral U-shaped web (not shown) adapted to extend forwardly and rearwardly of the tubular projection 80a at the midpoint thereof. The ends of the bight portion of the U-shaped web are provided with flanges engaging the front and rear of post 51a. The bight portion engages the side of post 51a having the tapered recess 76. It will be apparent that juice bowl 80 is firmly supported by a combination of one or more of the U-shaped web, post 51a, handle 51b, recess 82, recess 76, tubular projection 80a and bore 94. The recess 82 is elongated and extends along the longitudinal axis of handle 51b to insure satisfactory support. The bottom of the U-shaped web integral with bowl 80 terminates adjacent the housing 51 and it may engage such housing for further support. It will be understood that the reamer shaft 92 will be received within the open upper end of the hollow spindle 41 in a manner so that a notch 98 in the end of shaft 92 engages the pin 47, whereby rotation of the hollow spindle 41 will cause the desired rotation of the reamer shaft 92 and, consequently, the reamer 90.

In view of the detailed description included above, the operation of the beater ejector mechanism and the improved juice extractor arrangement of the present invention will readily be understood by those skilled in the art. Moreover, it will be apparent that the juice extractor arrangement does not in any way interfere with the beater ejector mechanism including the knob 60 projecting above the handle.

While there has been illustrated and described a particular embodiment of the present invention, it will be understood that changes and modifications may occur to those skilled in the art, and it is, therefore, contemplated by the appended claims to cover all such changes and modifications as fall within the true spirit and scope of the present invention.

What is claimed as new and desired to be secured by Letters Patent of the United States is:

1. A food mixer comprising a power unit having a housing defined by a bottom wall having an opening therein, a gear casing within said housing, a pair of hollow spindle sleeves operatively connected to means within said gear casing, a beater element detachably connected to each of said spindle sleeves, an ejector mechanism comprising an ejecting projection fixed on each beater element, an ejector member having a configuration and size to be received in said opening and generally in the plane of said opening to define a closure for said opening, said ejector member including means for freely pivoting said member along one edge thereof and along one edge of said opening, said member being disposed below said spindle sleeves and above said ejecting projections, said member being provided with spaced apertures aligned with the axes of said spindle sleeves whereby said beater elements may extend therethrough drivingly to engage said spindle sleeves, spring means for holding said ejector member in position to close said opening but permitting said member to pivot downwardly about said one edge against the bias of said spring means, a reciprocating link slidable along the front of said gear casing, a knob fixed to the upper end of said link and projecting above said housing, the lower end of said link bearing on the end of said ejector member remote from said one edge for producing a pivotal movement of the ejector member to move said member through said opening into contact with the ejecting projections on said spindle sleeves.

2. The food mixer of claim 1 wherein said opening is rectangular in shape and said ejector member is rectangular to fit into and close said opening.

3. The food mixer of claim 1 wherein said ejector member includes an integral projection adjacent one of said apertures.

References Cited
UNITED STATES PATENTS

| | | | |
|---|---|---|---|
| 2,815,939 | 12/1957 | Kibbe | 259—1 |
| 2,974,935 | 3/1961 | Smader | 259—1 |
| 3,198,490 | 8/1965 | Jepson et al. | 259—1 |

FOREIGN PATENTS

| | | |
|---|---|---|
| 1,261,027 | 4/1961 | France. |
| 628,480 | 11/1961 | Italy. |

WILLIAM I. PRICE, *Primary Examiner.*